(12) United States Patent
Flemming

(10) Patent No.: US 7,467,477 B1
(45) Date of Patent: Dec. 23, 2008

(54) REAR DERAILLEUR HANGER ALIGNMENT TOOL

(75) Inventor: Brett Flemming, Vancouver, WA (US)

(73) Assignee: Shimano Inc., Osaka (JP)

( * ) Notice: Subject to any disclaimer, the term of this patent is extended or adjusted under 35 U.S.C. 154(b) by 19 days.

(21) Appl. No.: 11/828,535

(22) Filed: Jul. 26, 2007

(51) Int. Cl.
*G01B 5/25* (2006.01)

(52) U.S. Cl. ........................................ 33/533
(58) Field of Classification Search ............ 33/533, 33/613, 645
See application file for complete search history.

(56) References Cited

U.S. PATENT DOCUMENTS

| | | | | |
|---|---|---|---|---|
| 3,925,873 | A * | 12/1975 | Mecum | 29/271 |
| 4,286,953 | A * | 9/1981 | Shimano | 474/80 |
| 4,868,993 | A * | 9/1989 | Kvale | 33/608 |
| 5,346,434 | A * | 9/1994 | Hsu | 474/82 |
| 5,694,699 | A * | 12/1997 | Folson | 33/645 |
| 2001/0009070 | A1* | 7/2001 | Lovesy | 33/203 |
| 2003/0083163 | A1* | 5/2003 | Nanko | 474/82 |
| 2008/0196263 | A1* | 8/2008 | Okura et al. | 33/613 |

OTHER PUBLICATIONS

Park Tool; Derailleur Hanger Alignment Gauge DAG-1; prior to Jul. 2007; www.parktool.com, St. Paul, MN, USA.

* cited by examiner

*Primary Examiner*—G. Bradley Bennett
(74) *Attorney, Agent, or Firm*—Global IP Counselors, LLP

(57) ABSTRACT

A rear derailleur hanger alignment tool is provided with hanger attachment structure, an elongated main arm, a movable body, an indicator and an indicator positioning structure. The hanger attachment structure is attachable to a rear derailleur hanger. The movable body is movably coupled to the elongated main arm between first and second ends of the elongated main arm to slide axially along a longitudinal axis of the elongated main arm and to rotate about the longitudinal axis of the elongated main arm. The indicator is movably coupled to the movable body to move perpendicular to the longitudinal axis of the elongated main arm. The indicator positioning structure is operatively formed between the movable body and the elongated main arm to selectively maintain the indicator in a predetermined angular position with respect to the longitudinal axis of the elongated main arm.

10 Claims, 16 Drawing Sheets

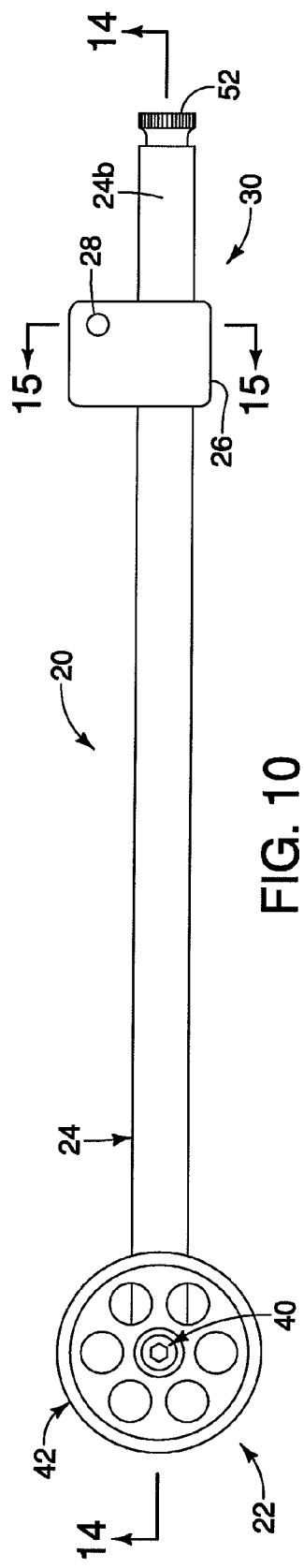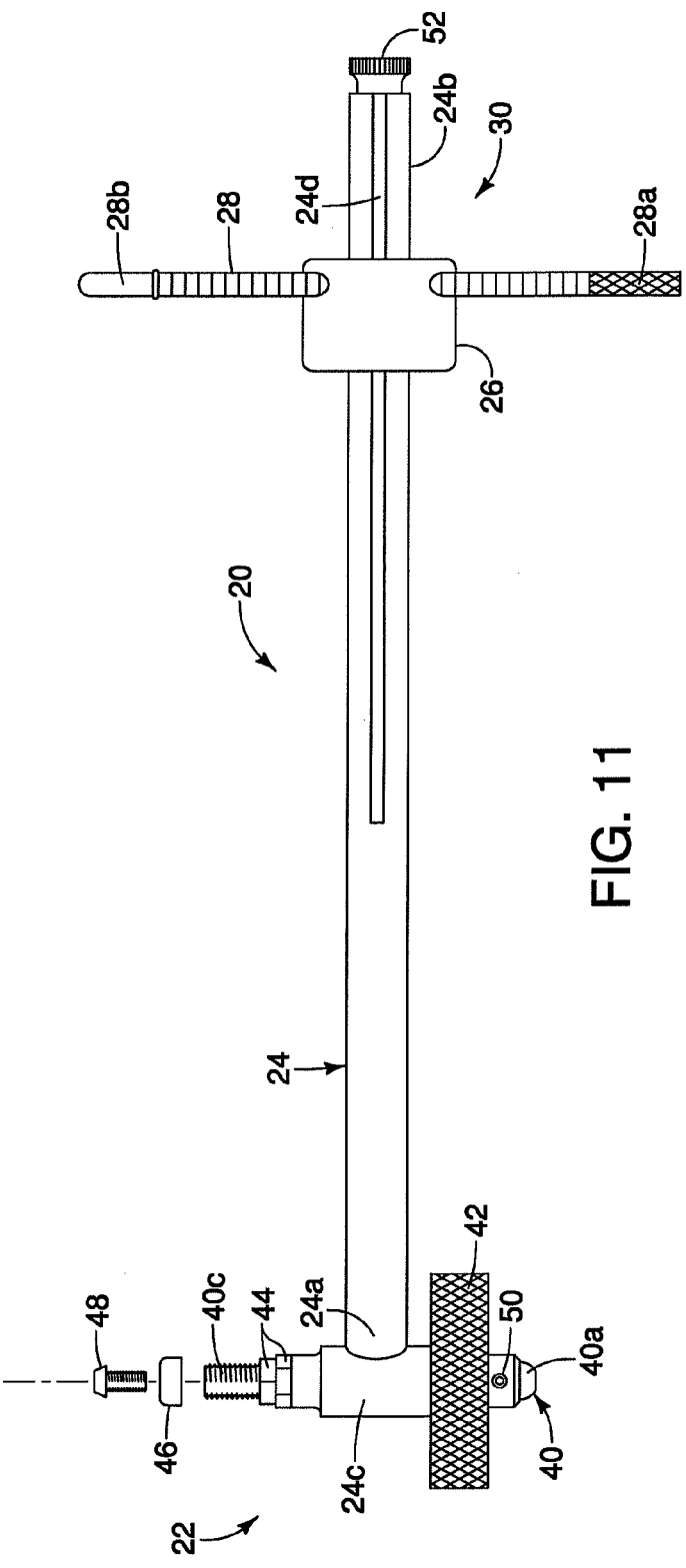
FIG. 10
FIG. 11

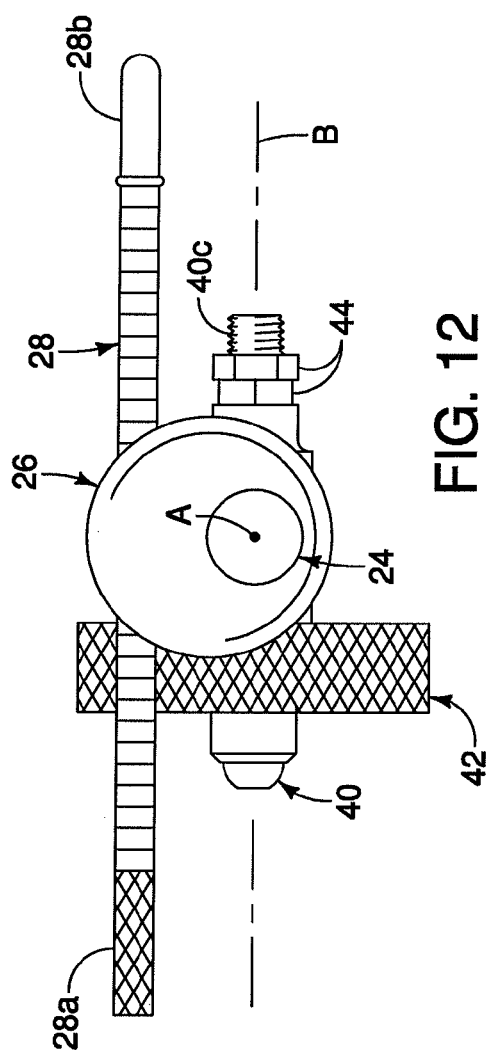
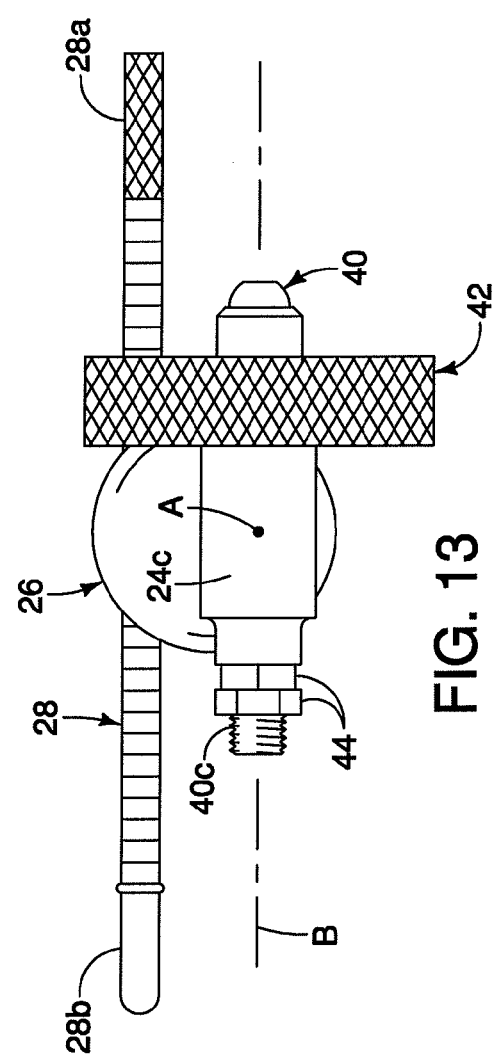

US 7,467,477 B1

REAR DERAILLEUR HANGER ALIGNMENT TOOL

BACKGROUND OF THE INVENTION

1. Field of the Invention

This invention generally relates to a rear derailleur hanger alignment tool for a bicycle that has a rear derailleur hanger for mounting a rear derailleur thereto.

2. Background Information

Bicycling is becoming an increasingly more popular form of recreation as well as a means of transportation. Moreover, bicycling has become a very popular competitive sport for both amateurs and professionals. Many bicycles use a rear derailleur to change gears. Typically, the rear derailleur is mounted to a rear derailleur hanger of the bicycle frame. Sometimes when the bicycle falls over, the rear derailleur hits the ground, which can bend the rear derailleur hanger of the bicycle frame inward towards the center of the bicycle. When the rear derailleur hanger of the bicycle frame is bent, this often results in poor shifting performance. Thus, tools have been proposed for determining misalignment of derailleur hanger. One example of such a tool is a derailleur hanger alignment gauge model DAG-1 that is sold by Park Tool USA. While this tool generally works well, this tool can be somewhat difficult to measure several points due to interference with a chain stay, a fender, a rack or other bicycle accessories. In particular, the chain stay, the fender, the rack or the other bicycle accessories may block the gauge from rotating to the various points for taking measurement. To solve this problem, the derailleur hanger alignment gauge is provided with O-rings that are used as markers so that the gauge can be moved to pass the obstacle, and then the gauge can be returned to its original position. However, this arrangement requires setting O-rings and then moving the gauge, which can result in errors.

In view of the above, it will be apparent to those skilled in the art from this disclosure that there exists a need for an improved rear derailleur hanger alignment tool. This invention addresses this need in the art as well as other needs, which will become apparent to those skilled in the art from this disclosure.

SUMMARY OF THE INVENTION

One object of the present invention is to provide a rear derailleur hanger alignment tool that is relatively easy to use.

The foregoing objects can basically be attained by providing a rear derailleur hanger alignment tool that basically comprises hanger attachment structure, an elongated main arm, a movable body, an indicator and an indicator positioning structure. The hanger attachment structure is configured to be attached to a rear derailleur hanger. The elongated main arm includes a first end and a second end, with the hanger attachment structure coupled adjacent to the first end of the elongated main arm. The movable body is movably coupled to the elongated main arm between the first and second ends of the elongated main arm to slide axially along a longitudinal axis of the elongated main arm and to rotate about the longitudinal axis of the elongated main arm. The indicator is movably coupled to the movable body to move perpendicular to the longitudinal axis of the elongated main arm. The indicator positioning structure is operatively formed between the movable body and the elongated main arm to selectively maintain the indicator in a predetermined angular position with respect to the longitudinal axis of the elongated main arm.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 10 is a first side elevational view of the rear derailleur hanger alignment tool illustrated in FIG. 9;

FIG. 11 is a top plan view of the rear derailleur hanger alignment tool illustrated in FIGS. 9 and 10;

FIG. 12 is a first end elevational view of the rear derailleur hanger alignment tool illustrated in FIGS. 9 to 11;

FIG. 13 is a second end elevational view of the rear derailleur hanger alignment tool illustrated in FIGS. 9 to 12;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
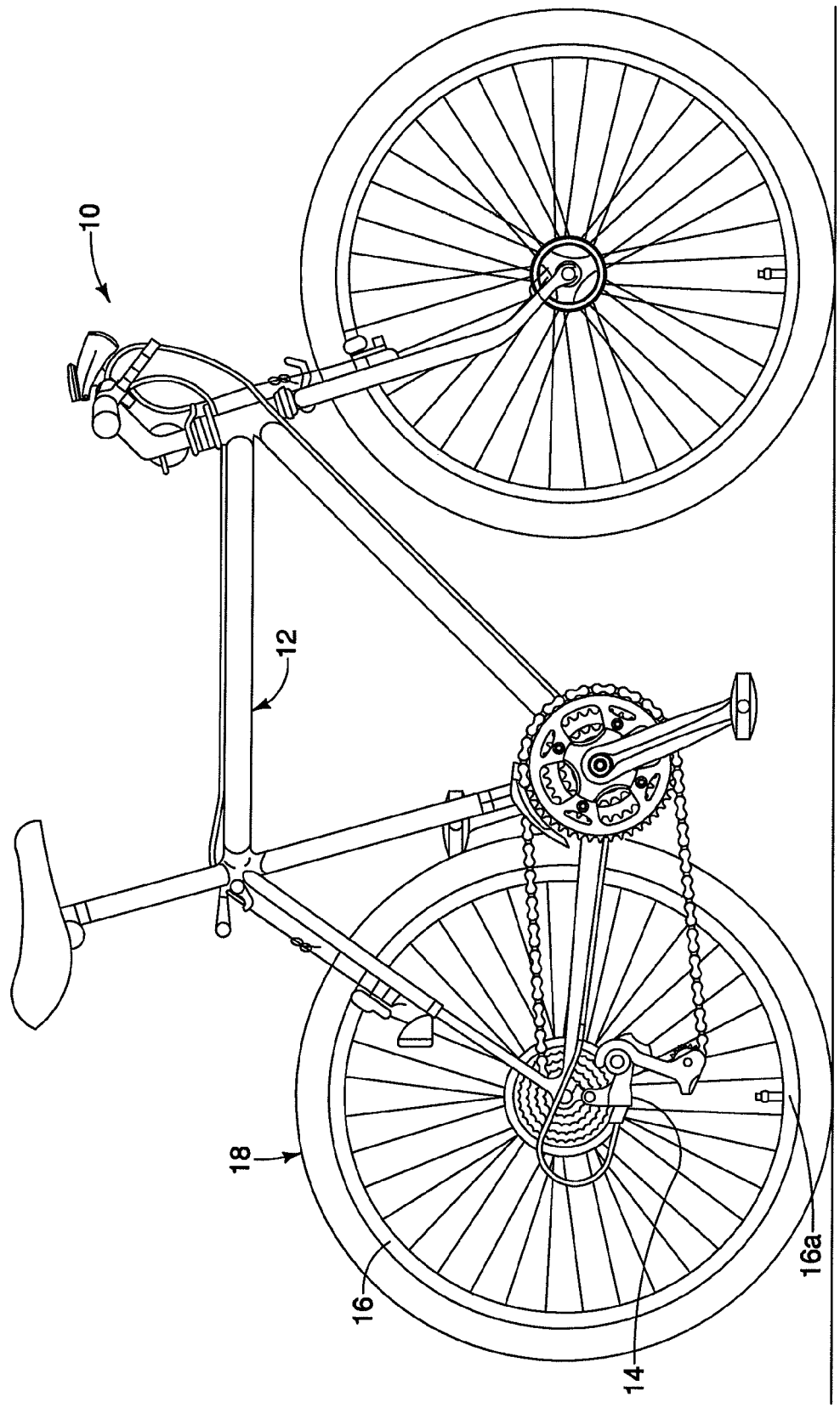
FIG. 1 is a side elevational view of a bicycle equipped having a rear derailleur hanger with a rear derailleur
Figure 2:
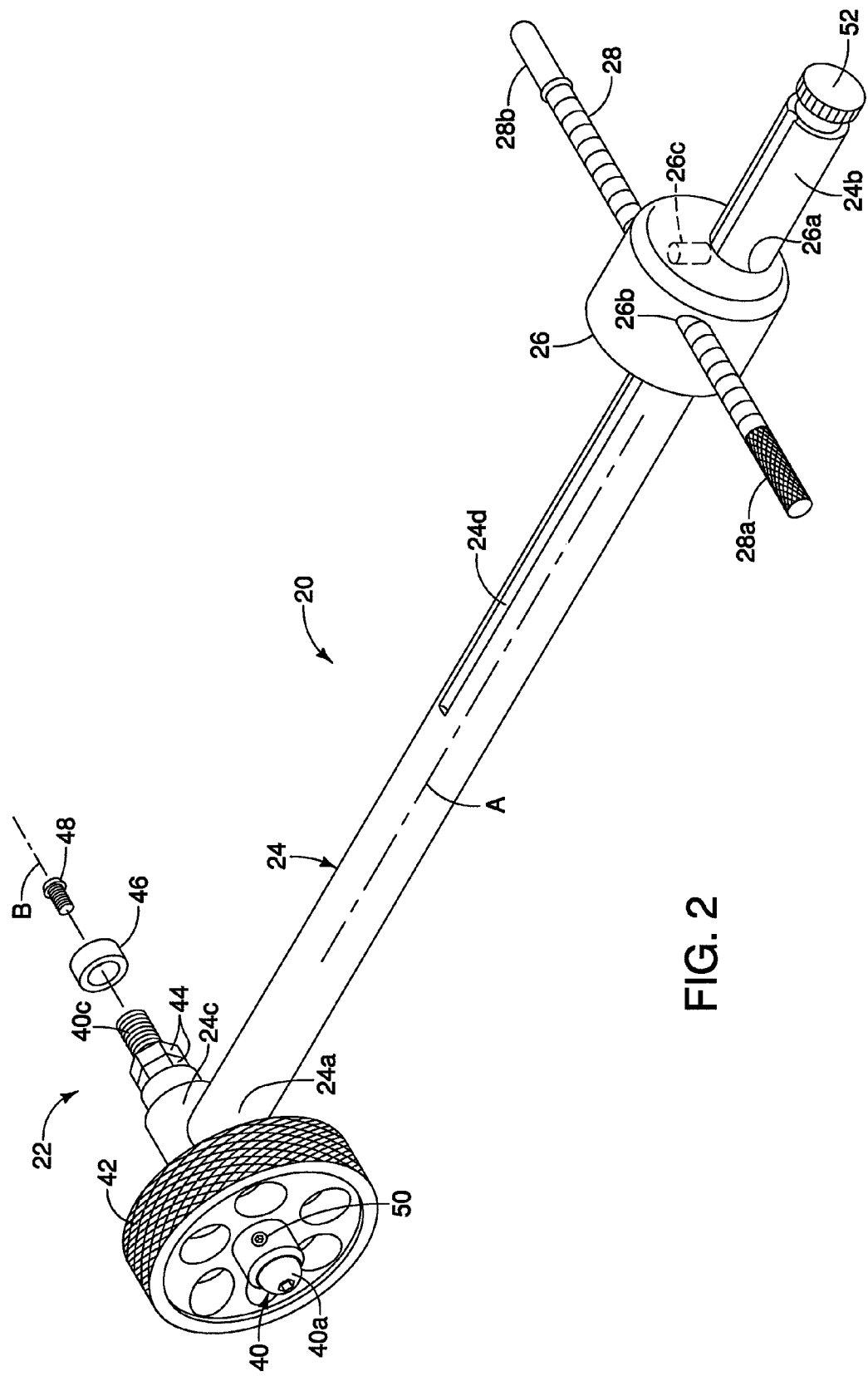
FIG. 2 is a perspective view of a rear derailleur hanger alignment tool in accordance with one embodiment of the present invention.
Figure 3:
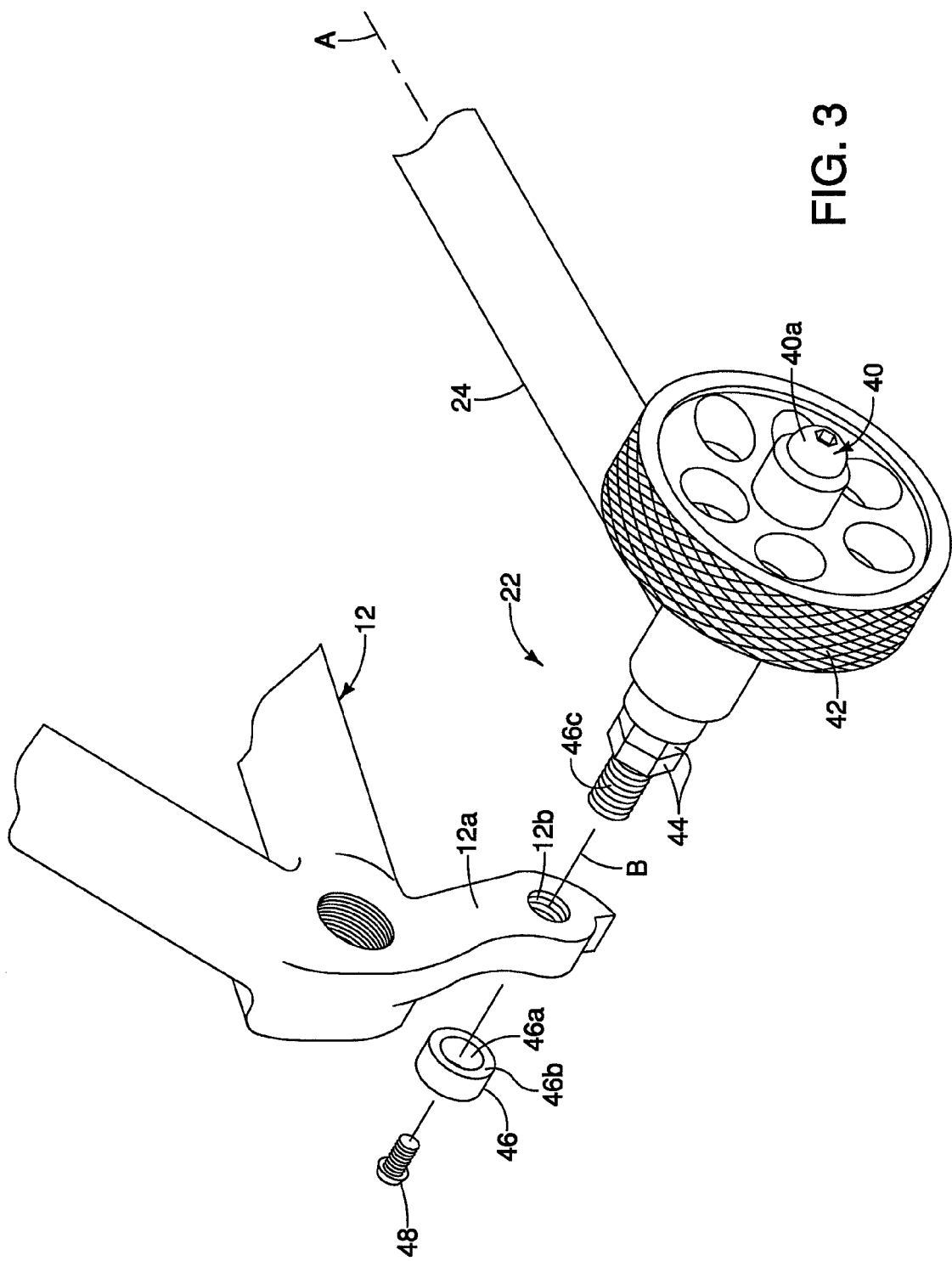
FIG. 3 is a partial perspective view of the rear derailleur hanger of the bicycle and a hanger attachment structure of the rear derailleur hanger alignment tool prior to attachment of the hanger attachment structure of the rear derailleur hanger alignment tool to the rear derailleur hanger of the bicycle.
Figure 4:
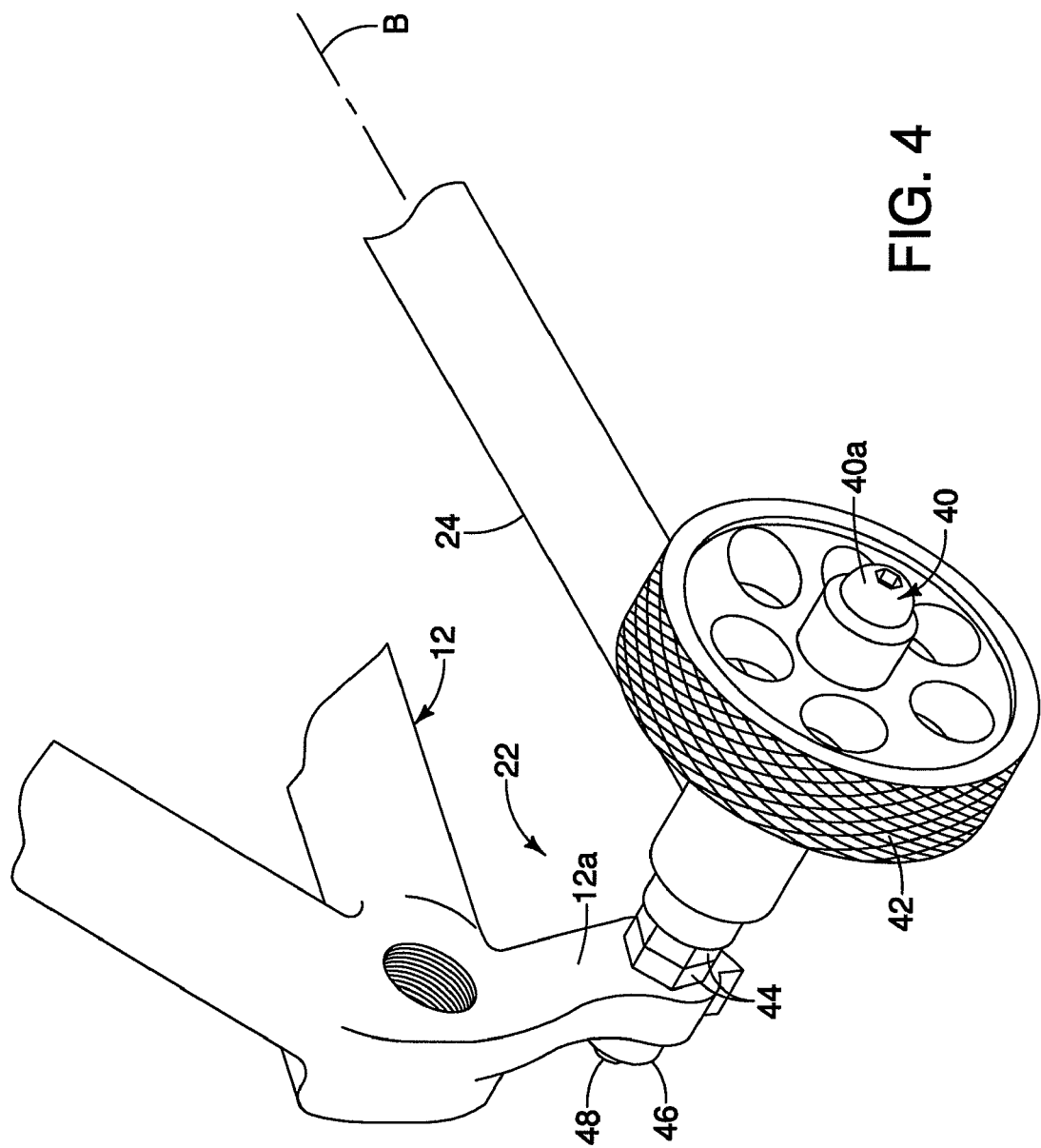
FIG. 4 is a partial perspective view of the rear derailleur hanger of the bicycle and the hanger attachment structure of the rear derailleur hanger alignment tool after attachment of the hanger attachment structure of the rear derailleur hanger alignment tool to the rear derailleur hanger of the bicycle.
Figure 5:
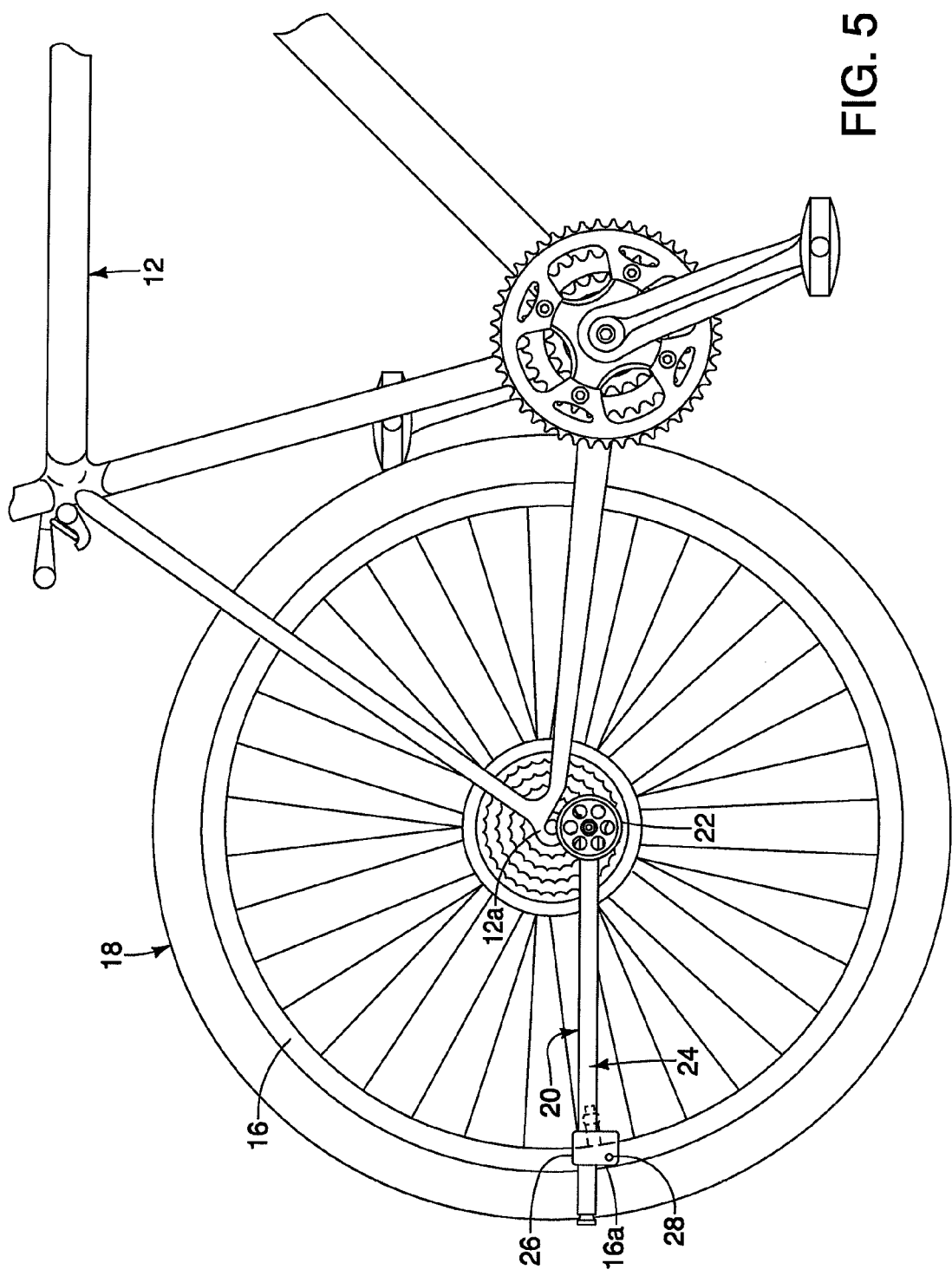
FIG. 5 is a partial perspective view of the rear end of the bicycle with the rear derailleur hanger alignment tool attached to the rear derailleur hanger of the bicycle for determining alignment of the rear derailleur hanger.
Figure 6:
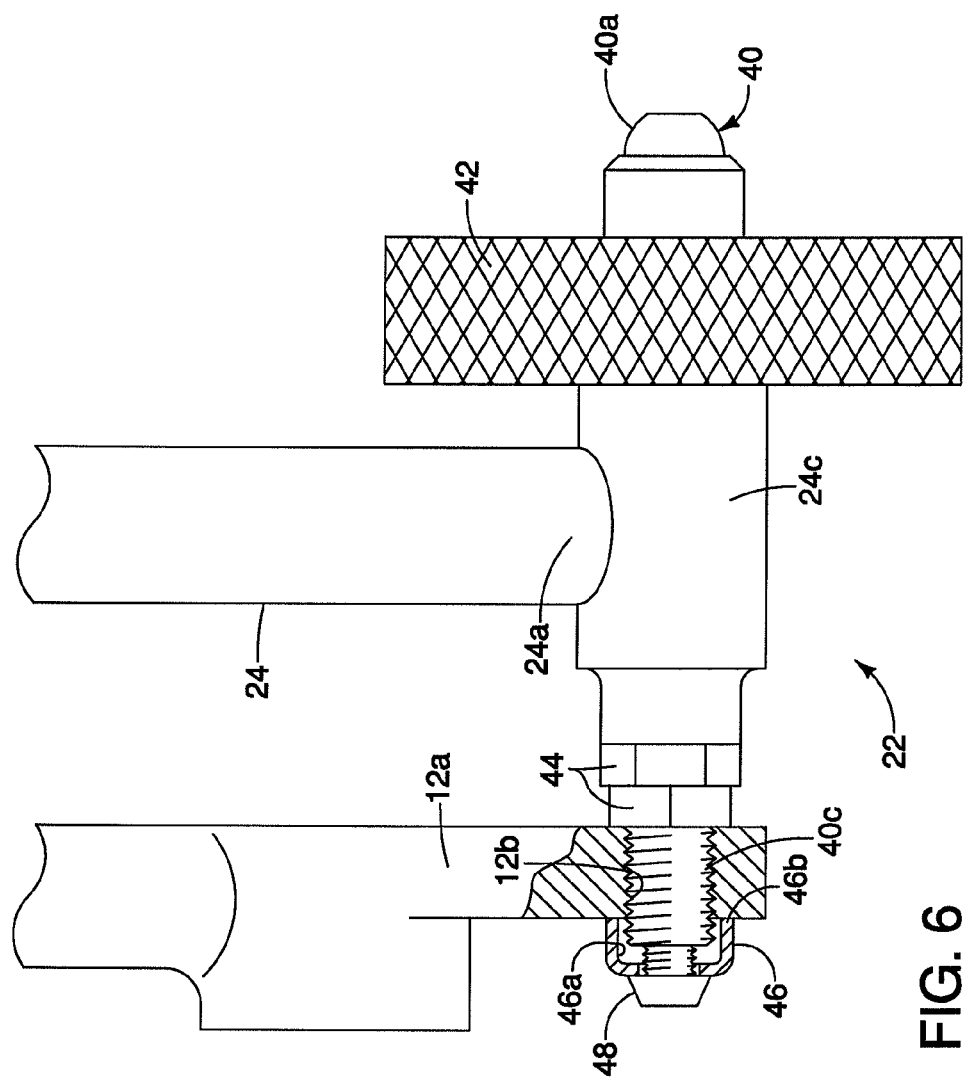
FIG. 6 is a partial rear elevational view of the rear derailleur hanger of the bicycle and the hanger attachment structure of the rear derailleur hanger alignment tool after attachment of the hanger attachment structure of the rear derailleur hanger alignment tool to the rear derailleur hanger of the bicycle.
Figure 8:
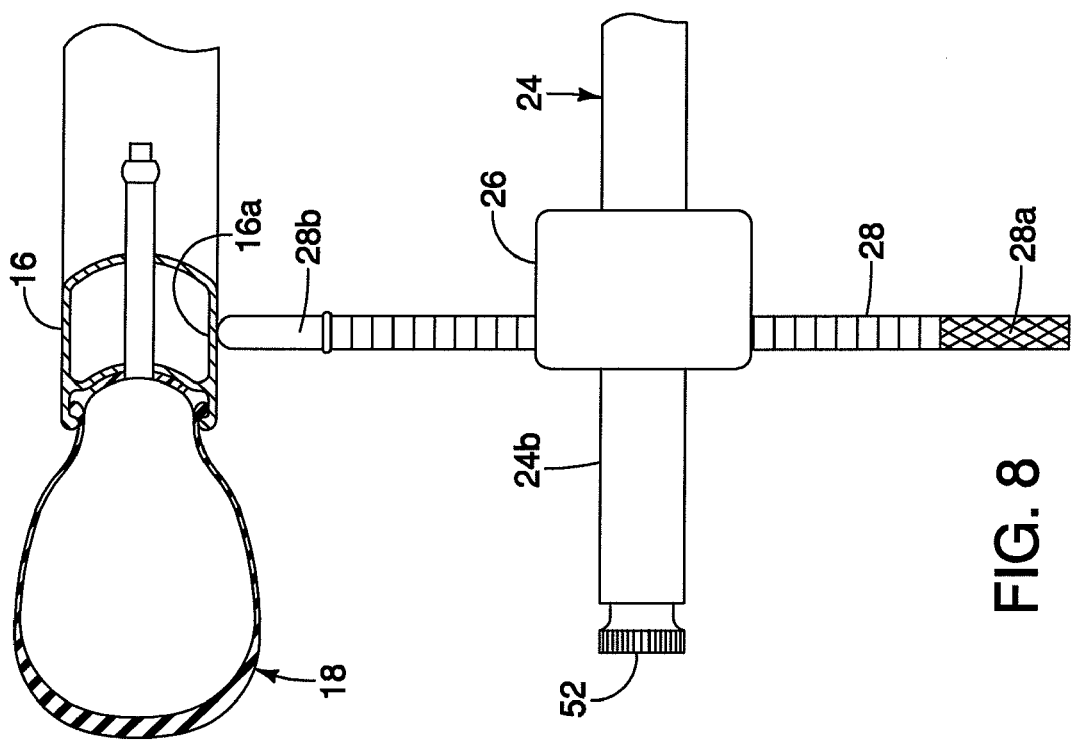
FIG. 8 is a partial top view, similar to FIG. 7, of the hanger attachment structure of the rear derailleur hanger alignment tool illustrated in FIG. 5, with a portion of the rear wheel shown in cross section and the indicator rod contacting the rim of the wheel.
Figure 7:
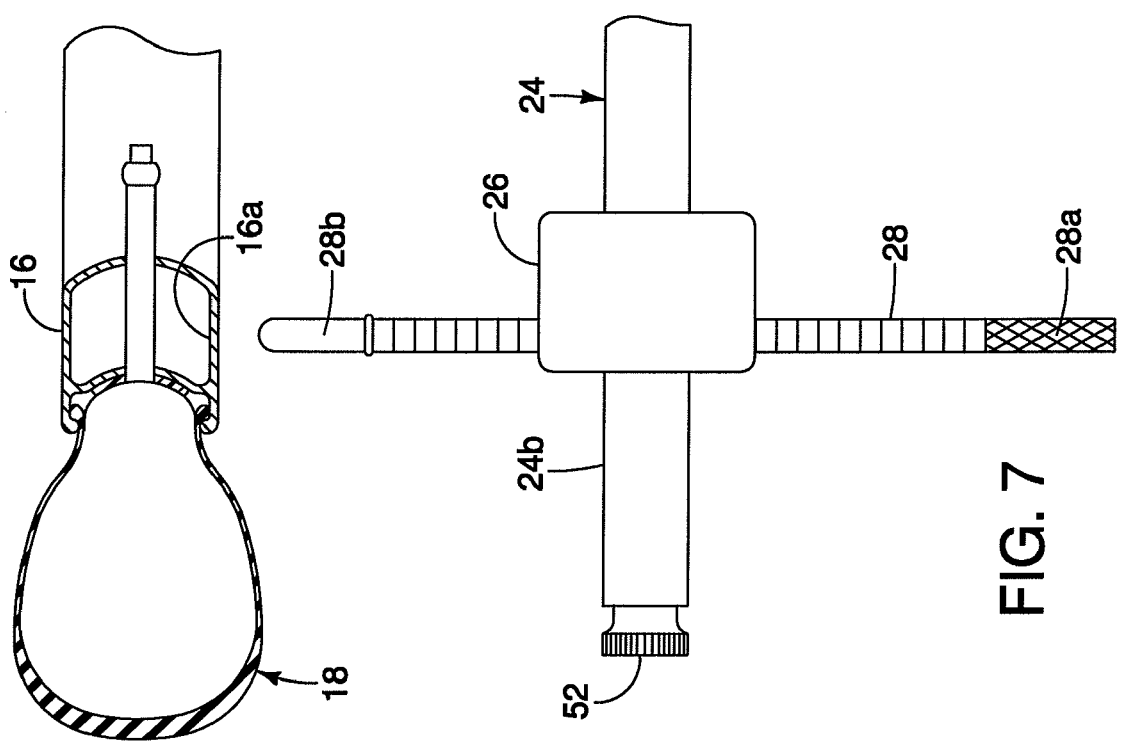
FIG. 7 is a partial top plan view of the hanger attachment structure of the rear derailleur hanger alignment tool illustrated in FIG. 5, with a portion of the rear wheel shown in cross section and the indicator rod spaced from the rim of the wheel.
Figure 9:
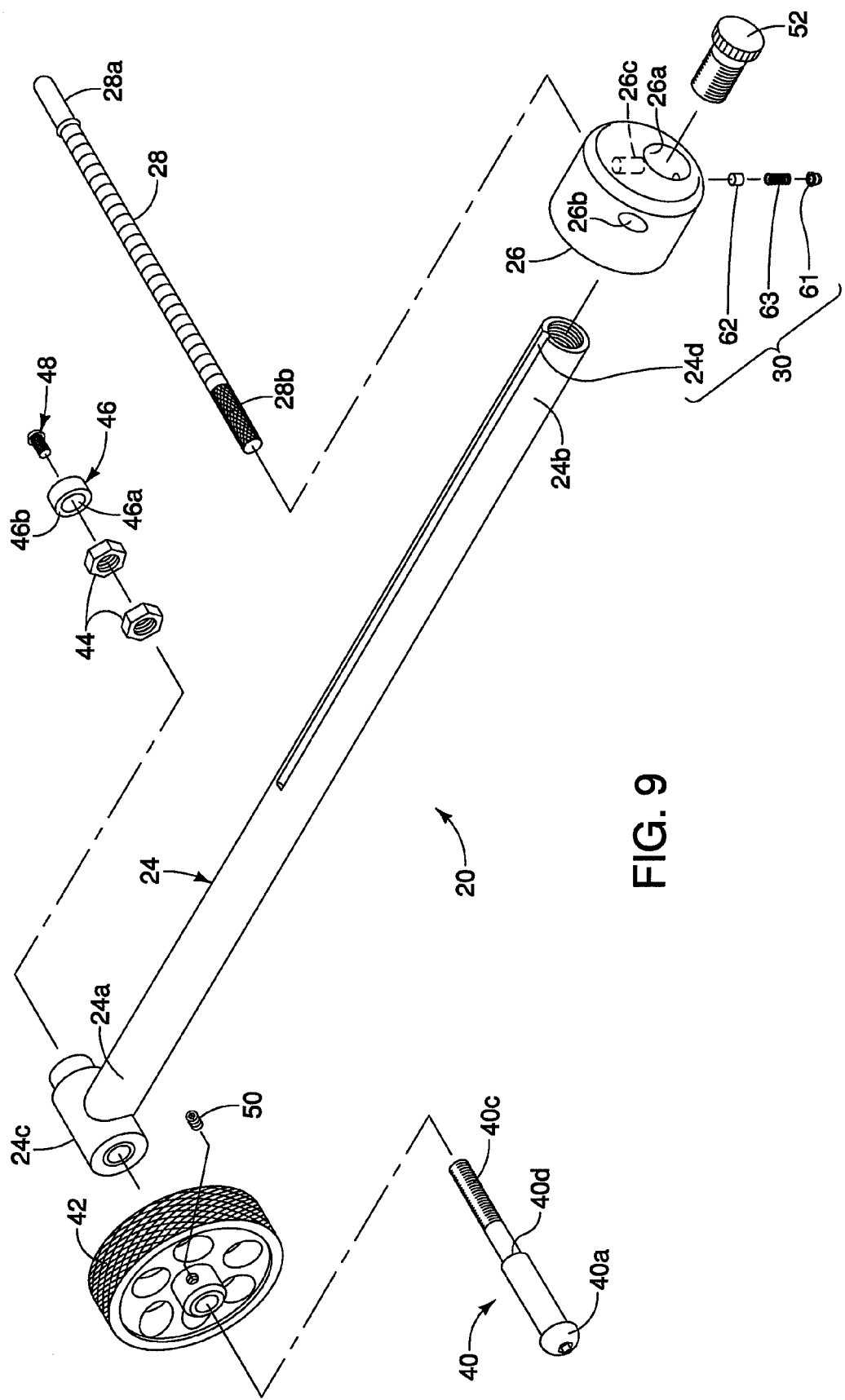
FIG. 9 is an exploded perspective view of the rear derailleur hanger alignment tool in accordance with the illustrated embodiment.
Figure 14:
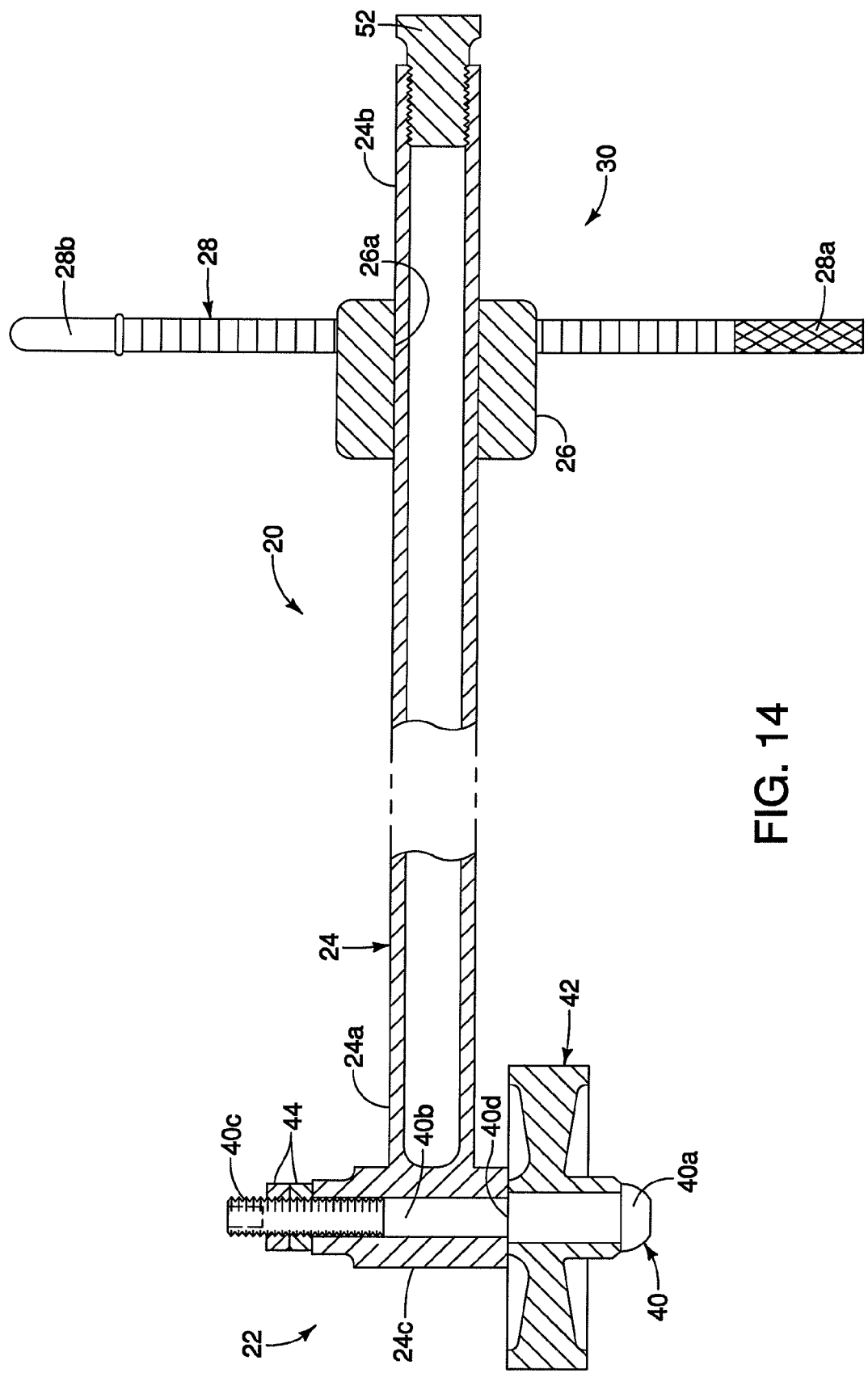
FIG. 14 is a longitudinal cross sectional view of the rear derailleur hanger alignment tool illustrated in FIGS. 9 to 14 as viewed along section line 14-14 in FIG. 10.

Referring initially to FIG. 1, a bicycle 10 is illustrated that includes a frame 12 with a rear derailleur 14 mounted thereto. The bicycle 10 can be any type of bicycle that has a rear derailleur hanger 12a for mounting the rear derailleur 14. As seen in FIGS. 2 to 5, a rear derailleur hanger alignment tool 20 is illustrated in accordance with a first embodiment. The rear derailleur hanger alignment tool 20 is used to determine the alignment of the rear derailleur hanger 12a by measuring a transverse distance of a constant reference point 16a on a rear rim 16 of a rear wheel 18 with respect to the rear derailleur hanger 12a at various positions by rotating the rear wheel 18. Preferably, the constant reference point 16a is a point adjacent the tire valve stem.

Basically, the rear derailleur hanger alignment tool 20 includes a hanger attachment structure 22, an elongated main arm 24, a movable body 26, an indicator rod 28 and an indicator positioning structure 30. The hanger attachment structure 22 is configured to be attached to the rear derailleur hanger 12a. The elongated main arm 24 is rotatably attached to the hanger attachment structure 22. The movable body 26 is slideably attached to the elongated main arm 24. The indicator rod 28 is slideably attached to the movable body 26. The indicator positioning structure 30 is operatively formed between the movable body 26 and the elongated main arm 24 to selectively maintain the indicator rod 28 in a predetermined angular position with respect to a longitudinal axis A of the elongated main arm 24. This indicator positioning structure 30 is configured and arranged to allow rotation of the movable body 26 and the indicator rod 28 around the longitudinal axis A of the elongated main arm 24. The indicator positioning structure 30 is configured and arranged so that the indicator rod 28 can be moved out of the way of obstacles (e.g., a chain stay, a fender, a rack or other bicycle accessories) to rotate the movable body 26 and the indicator rod 28 three hundred and sixty degrees without changing the relative position of the indicator rod 28 with respect to the movable body 26. Thus, many measurement points can be easily and accurately taken to determine the alignment of the rear derailleur hanger 12a.

As best seen in FIGS. 9 to 14, the hanger attachment structure 22 basically includes a bolt 40, a handle or knob 42, a pair of attachment nuts 44, a support cap 46 and an attachment screw 48. The handle 42 is fixed to the bolt 40 by a set screw 50 so that the bolt 40 can be easily threaded into the derailleur mounting hole 12b of the rear derailleur hanger 12a by turning the handle 42.

The bolt 40 has a head portion 40a and a shaft portion 40b with an external thread 40c at the end opposite the head portion 40a. Preferably, the set screw 50 contacts a flat surface (not shown) on the shaft portion 40b. The shaft portion 40b is also stepped shaped so that a shoulder 40d is formed. The external thread 40c threadedly receives the attachment nuts 44 for holding the elongated main arm 24 on the bolt 40.

The support cap 46 is attached to the free end of the shaft portion 40b of the bolt 40 by the attachment screw 48 that screws into a hole in the free end of the shaft portion 40b. The support cap 46 has a recess 46a that is dimensioned so as to fit over the free end of the shaft portion 40b of the bolt 40 with a prescribed amount of clearance therebetween. Accordingly, one of the attachment nuts 44 forms a first abutment member, while an end edge 46b of the support cap 46 forms a second abutment member, with the first and second abutment members being arranged to support opposite side surfaces of the rear derailleur hanger 12a when the rear derailleur hanger alignment tool 20 is attached to the rear derailleur hanger 12a. In this way, the support cap 46 contacts the rear derailleur hanger 12a to distribute the force if the rear derailleur hanger alignment tool 20 is used to bend the rear derailleur hanger 12a back into alignment.

The elongated main arm 24 is preferably a hard rigid member constructed of a suitable material such as a metallic material. The elongated main arm 24 including a first end 24a and a second end 24b, with the hanger attachment structure 22 coupled adjacent the first end 24a of the elongated main arm 24. The first end 24a of the elongated main arm 24 has a tubular member 24c fixedly attached thereto for pivotally receiving the bolt 40. In other words, the first end 24a of the elongated main arm 24 is pivotally mounted to the bolt 40 of the hanger attachment structure 22 by the tubular member 24c to pivot about a pivot axis B that is perpendicularly arranged with respect to the longitudinal axis A of the elongated main arm 24. The tubular member 24c is retained on the shaft portion 40b of the bolt 40 by the attachment nuts 44. In particular, axial movement of the tubular member 24c on the shaft portion 40b of the bolt 40 restrained by the shoulder 40d and the attachment nuts 44. The axial play of the tubular member 24c on the shaft portion 40b of the bolt 40 can be adjusted by changing the axial location of the attachment nuts 44 on the shaft portion 40b of the bolt 40. Thus, wear can be compensation for as needed and/or desired.

The elongated main arm 24 is also preferably provided with a longitudinally extending groove or recess 24d. The longitudinally extending recess 24d cooperates with the movable body 26 to maintain proper orientation of the movable body 26 on the elongated main arm 24. Thus, the longitudinally extending recess 24d forms a part of the indicator positioning structure 30 as explained below.

The movable body 26 is preferably a hard rigid member constructed of a suitable material such as a metallic material. The movable body 26 is movably coupled to the elongated main arm 24 between the first and second ends 24a and 24b of the elongated main arm 24 to slide axially along the longitudinal axis A of the elongated main arm 24 and to rotate about the longitudinal axis A of the elongated main arm 24. Preferably, the movable body 26 is prevented from sliding off the elongated main arm 24 by a stopper 52 that is threaded into the second end 24b of the elongated main arm 24. The movable body 26 is provided with a first bore 26a for slideably and rotatably receiving the elongated main arm 24. The movable body 26 is provided with a second bore 26b for slideably receiving the indicator rod 28. Preferably, the first and second bores 26a and 26b have center axes that are perpendicularly arranged with respect to each other. The movable body 26 is provided with a third bore 26c that receives a part of the indicator positioning structure 30 as explained below. The third bore 26c has a center axis that is perpendicularly arranged with respect to the center axes of the first and second bores 26a and 26b.

The indicator rod 28 is preferably a hard rigid member constructed of a suitable material such as a metallic material. The indicator rod 28 is movably coupled to the movable body 26 to move perpendicular to the longitudinal axis A of the elongated main arm 24. In the illustrated embodiment, the indicator rod 28 is an elongated rod shaped member. However, it will be apparent from this disclosure that other shapes are possible. Thus, the indicator rod 28 can be broadly referred to as a gauge or as an indicator. The indicator rod 28 has a knurled handle end 28a and a measuring end 28b. The measuring end 28b is preferably hardened and polished to avoid scratching the rim 16.

The indicator positioning structure 30 includes the longitudinally extending recess 24d of the elongated main arm 24, as mentioned above, and a first detent 61, a second detent 62 and a compression spring 63 disposed between the first and second detents 61 and 62. The first and second detents 61 and 62 and the compression spring 63 are located in the third bore 26c of the movable body 26. The compression spring 63 is arranged between the first and second detents 61 and 62 to biases the first and second detents 61 and 62 in opposite directions.

The first and second detents 61 and 62 are movably coupled to the movable body 26 in the third bore 26c. The first detent 61 contacts the elongated main arm 24 to maintain the relative positional relationship between the elongated main arm 24 and the movable body 26, while the second detent 62 contacts the indicator rod 28 to maintain the relative positional relationship between the indicator rod 28 and the movable body 26. In other words, the first detent 61 contacts the elongated main arm 24 such that relative positional relationship between the elongated main arm 24 and the movable body 26 remains stable until an external force (other than gravity) is applied. Likewise, the second detent 62 contacts the indicator rod 28 such that relative positional relationship between the indicator rod 28 and the movable body 26 remains stable until an external force (other than gravity) is applied. The first detent 61 is disposed in the longitudinally extending recess 24d of the elongated main arm 24 when the movable body 26 is in a predetermined angular position that corresponds a position for taking measurements. In other words, when the first detent 61 is disposed in the longitudinally extending recess 24d of the elongated main arm 24, the axis of the indicator rod 28 is parallel to the axis B of the bolt 40.

To use the rear derailleur hanger alignment tool 20, the rear derailleur is first removed. The bicycle is preferably support on a stand so that the wheel 18 can be easily rotated. The rear derailleur hanger alignment tool 2 is now attached to the rear derailleur hanger 12a. In particular, the external thread 40c of the bolt 40 is threaded into the derailleur mounting hole 12b of the rear derailleur hanger 12a by turning the handle 42. Once the bolt 40 is attached to the rear derailleur hanger 12a, the support cap 46 is attached to the free end of the shaft portion 40b of the bolt 40 by the attachment screw 48. In this way, the support cap 46 contacts the rear derailleur hanger 12a to distribute the force if the rear derailleur hanger alignment tool 20 is used to bend the rear derailleur hanger 12a back into alignment.

Next, for example, the wheel 18 is rotated such that the constant reference point 16a (the tire valve stem) is located at a position corresponding to "9:00 o'clock". The elongated main arm 24 is then rotated toward the left side of the rim 16 to the position of the constant reference point 16a (the tire valve stem) e.g., "9:00 o'clock". By using this constant reference point 16a (the tire valve stem) on the rim 16, the wheel trueness or dish will not affect the alignment measurements. Now, the movable body 26 is slid along the elongated main arm 24 until the indicator rod 28 is located across from the constant reference point 16a (the tire valve stem) on the rim 16. The indicator rod 28 is then extended from the movable body 26 to contact the rim 16 at the constant reference point 16a.

Figure 16:
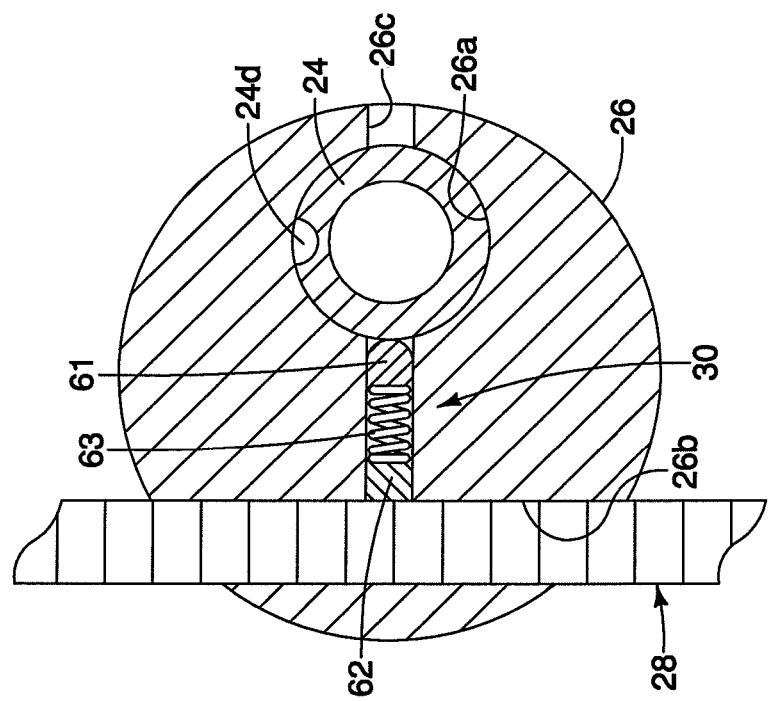
FIG. 16 is a transverse cross sectional view, similar to FIG. 13, of the rear derailleur hanger alignment tool illustrated in FIGS. 9 to 12, but with the movable body and the indicator rod rotated ninety degrees from the position illustrated in FIG. 13.
Figure 15:
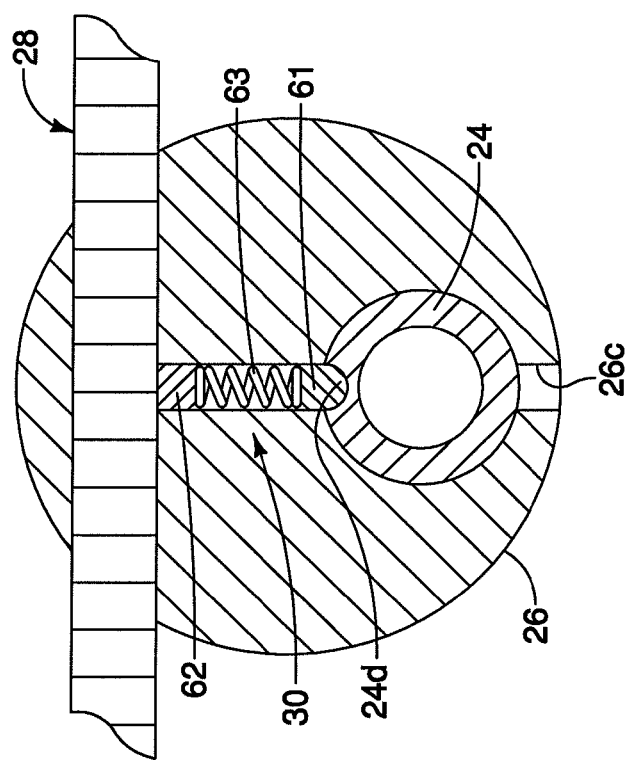
FIG. 15 is a transverse cross sectional view of the rear derailleur hanger alignment tool illustrated in FIGS. 9 to 14 as viewed along section line 15-15 in FIG. 10.
Figure 17:
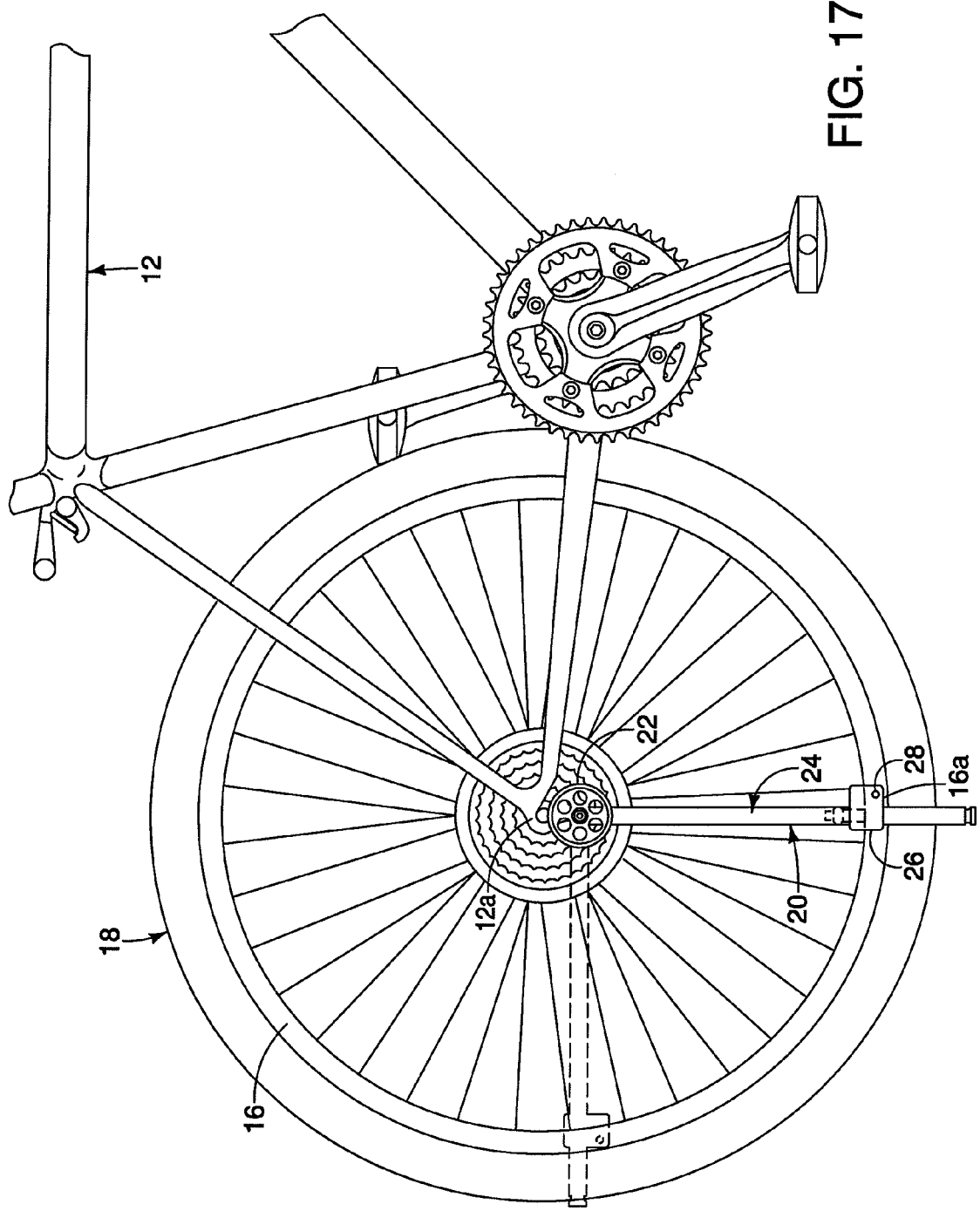
FIG. 17 is a partial perspective view, similar to FIG. 5, of the rear end of the bicycle with the rear derailleur hanger alignment tool attached to the rear derailleur hanger of the bicycle, but with the wheel and the rear derailleur hanger alignment tool rotated about ninety degrees from the position illustrated in FIG. 5.
Figure 18:
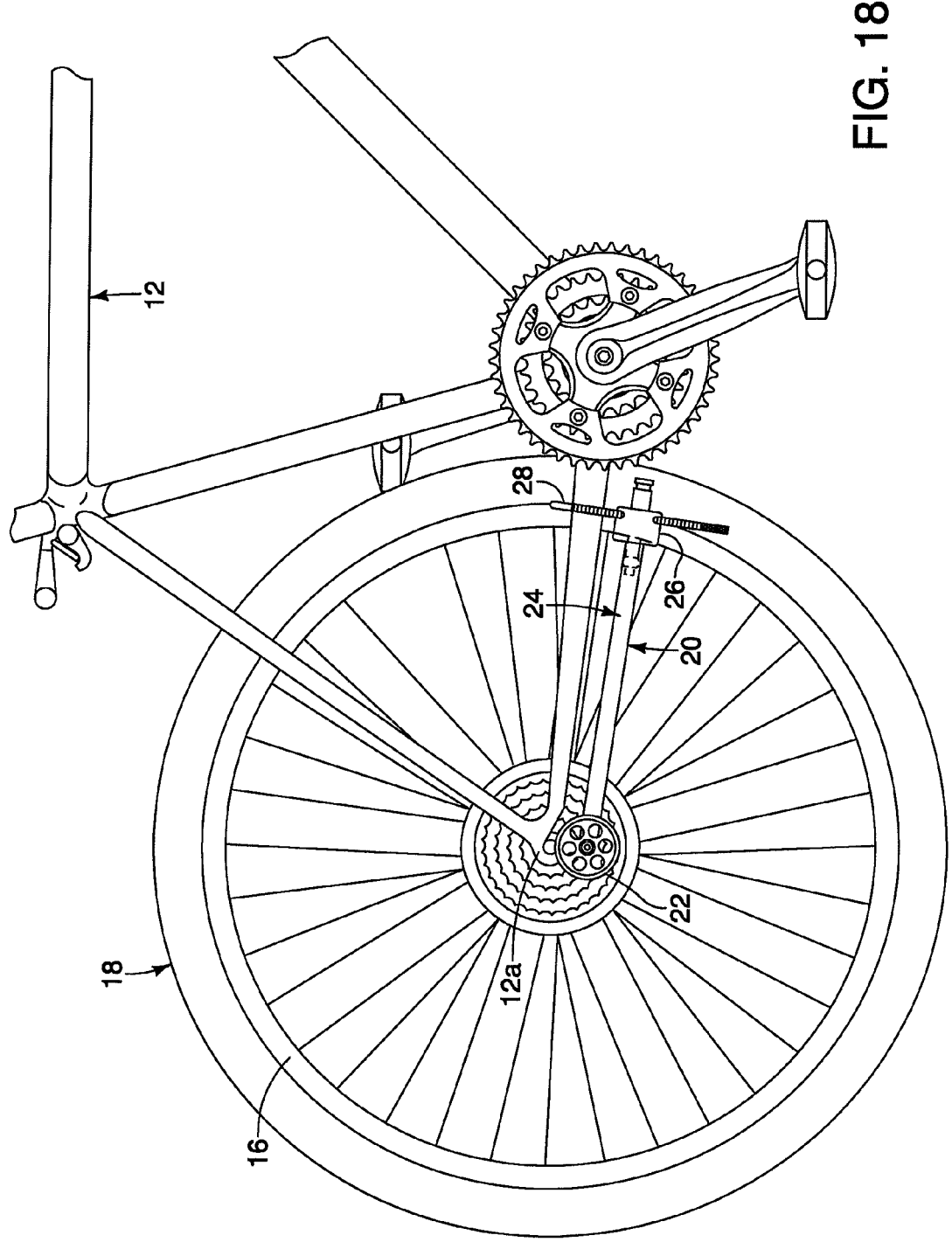
FIG. 18 is a partial perspective view, similar to FIGS. 5 and 17, of the rear end of the bicycle with the rear derailleur hanger alignment tool attached to the rear derailleur hanger of the bicycle, but with the wheel and the rear derailleur hanger alignment tool rotated counterclockwise from the position illustrated in FIG. 17 and the movable body and the indicator rod rotated ninety degrees from the position illustrated in FIGS. 5 and 17.
Figure 19:
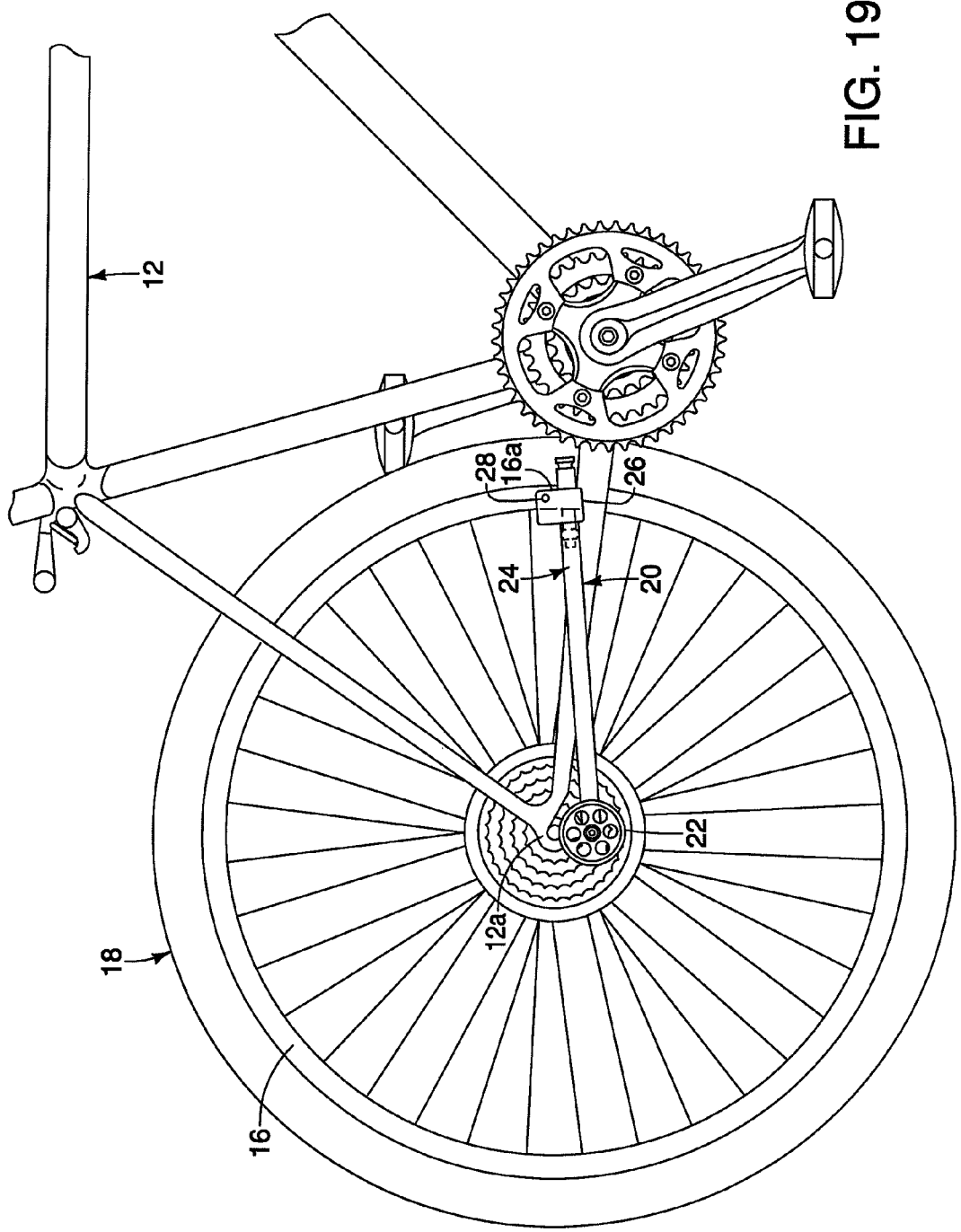
FIG. 19 is a partial perspective view, similar to FIGS. 5 and 17, of the rear end of the bicycle with the rear derailleur hanger alignment tool attached to the rear derailleur hanger of the bicycle, but with the wheel and the rear derailleur hanger alignment tool rotated counterclockwise about one hundred and eighty degrees from the position illustrated in FIG. 5.
Figure 20:
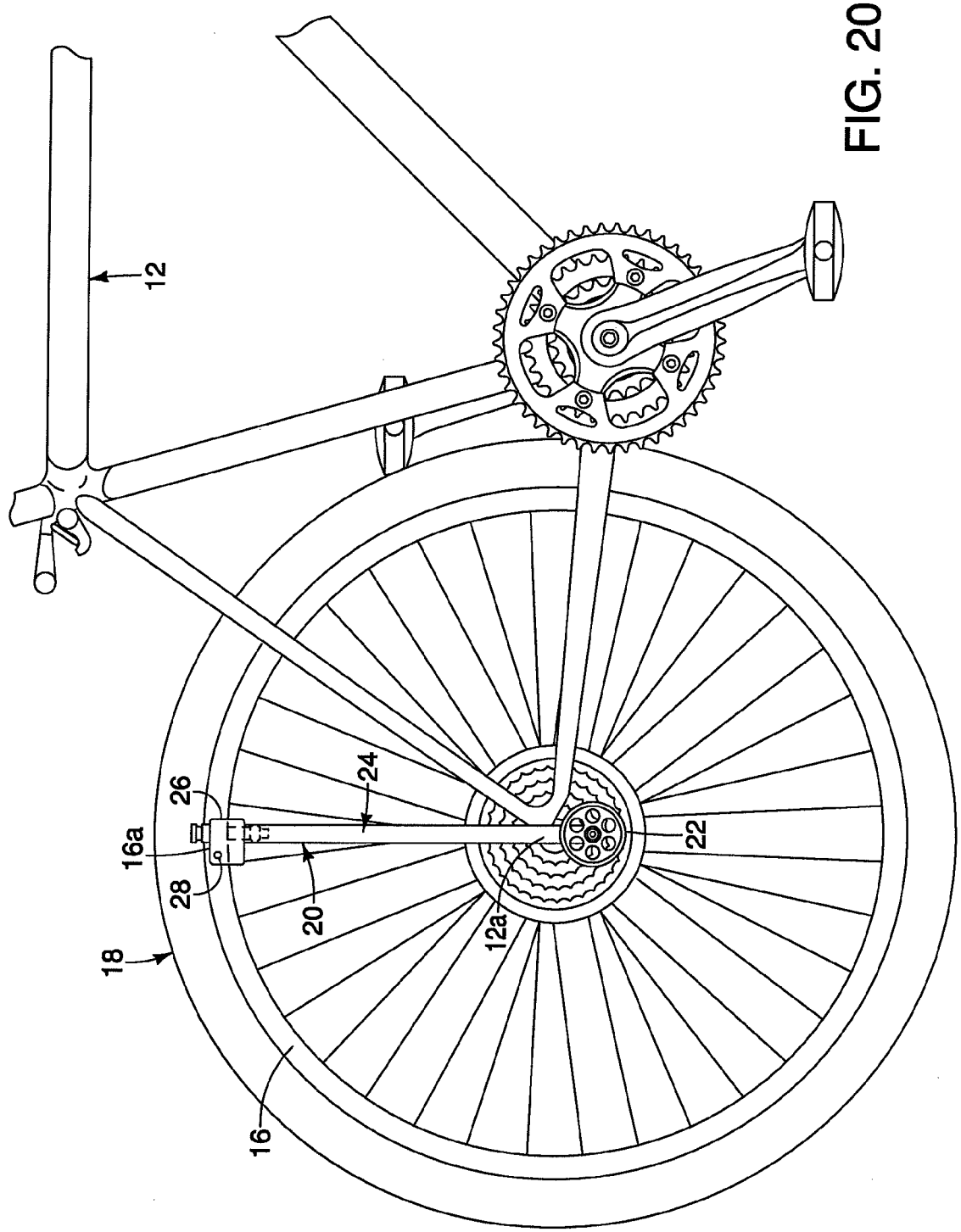
FIG. 20 is a partial perspective view, similar to FIGS. 5, 17 and 19, of the rear end of the bicycle with the rear derailleur hanger alignment tool attached to the rear derailleur hanger of the bicycle, but with the wheel and the rear derailleur hanger alignment tool rotated counterclockwise about two hundred and seventy degrees from the position illustrated in FIG. 5.

Now, several subsequent measurements can be made as seen in FIGS. 17 to 20. Preferably, the subsequent measurements are made at "6:00 o'clock", "3:00 o'clock" and "13:00 o'clock". If the elongated main arm 24 can not be rotated due to the indicator rod 28 hitting an obstacle (e.g., a chain stay, a fender, a rack or other bicycle accessories), then the movable body 26 is rotated about the longitudinal axis A of the elongated main arm 24 as seen in FIGS. 16 and 18 without changing the relative position of the indicator rod 28 with respect to the movable body 26. Once the movable body 26 passes the obstacle, the movable body 26 is rotated back so that the first detent engages the longitudinally extending recess 24d of the elongated main arm 24. In this position, the first detent 61 is disposed in the longitudinally extending recess 24d of the elongated main arm 24 so that the axis of the indicator rod 28 is parallel to the axis B of the bolt 40.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A rear derailleur hanger alignment tool comprising:
   a hanger attachment structure configured to be attached to a rear derailleur hanger;
   an elongated main arm including a first end and a second end, with the hanger attachment structure coupled adjacent to the first end of the elongated main arm;
   a movable body movably coupled to the elongated main arm between the first and second ends of the elongated main arm to slide axially along a longitudinal axis of the elongated main arm and to rotate about the longitudinal axis of the elongated main arm;
   an indicator movably coupled to the movable body to move perpendicular to the longitudinal axis of the elongated main arm; and
   an indicator positioning structure operatively formed between the movable body and the elongated main arm to selectively maintain the indicator in a predetermined angular position with respect to the longitudinal axis of the elongated main arm.

2. The rear derailleur hanger alignment tool according to claim 1, wherein
   the indicator positioning structure includes a longitudinally extending recess of the elongated main arm and a first detent movably coupled to the movable body, with the first detent biased against the recess of the elongated main arm when in the predetermined angular position.

3. The rear derailleur hanger alignment tool according to claim 1, wherein
   the first end of the elongated main arm is pivotally mounted to the hanger attachment structure to pivot about a pivot axis that is perpendicularly arranged with respect to the longitudinal axis of the elongated main arm.

4. The rear derailleur hanger alignment tool according to claim 1, wherein
   the hanger attachment structure includes a bolt with a head portion and a shaft portion with an external thread.

5. The rear derailleur hanger alignment tool according to claim 4, wherein
   the first end of the elongated main arm is pivotally mounted to the bolt of the hanger attachment structure to pivot about a pivot axis that is perpendicularly arranged with respect to the longitudinal axis of the elongated main arm.

6. The rear derailleur hanger alignment tool according to claim 2, wherein
   the indicator positioning structure further includes a second detent movably coupled to the movable body, with the second detent biased against the indicator.

7. The rear derailleur hanger alignment tool according to claim 2, wherein
   the indicator positioning structure further includes a spring that is arranged between the first and second detents to biases the first and second detents in opposite directions.

8. The rear derailleur hanger alignment tool according to claim 1, wherein
   the indicator is an elongated rod shaped member.

9. A rear derailleur hanger alignment tool comprising:
   a hanger attachment structure including a bolt with an external thread configured to be attached to a rear derailleur hanger, a first abutment member disposed on the bolt and a second abutment member disposed on the bolt, with the first and second abutment members being arranged to support opposite side surfaces of the rear derailleur hanger when the rear derailleur hanger alignment tool is attached to the rear derailleur hanger;
   an elongated main arm including a first end and a second end, with the hanger attachment structure coupled adjacent to the first end of the elongated main arm;
   a movable body movably coupled to the elongated main arm between the first and second ends of the elongated main arm to slide axially along a longitudinal axis of the elongated main arm; and
   an indicator movably coupled to the movable body to move perpendicular to the longitudinal axis of the elongated main arm.

10. A rear derailleur hanger alignment tool comprising:
    an elongated main arm including a first end with a tubular member and a second end;
    a hanger attachment structure including a bolt and a nut with the nut disposed on an external thread of the bolt, the tubular member being rotatably disposed on the bolt between the nut and an axial abutment of the bolt, the external thread of the bolt extends from the nut to be attached to a rear derailleur hanger;
    a movable body movably coupled to the elongated main arm between the first and second ends of the elongated main arm to slide axially along a longitudinal axis of the elongated main arm; and
    an indicator movably coupled to the movable body to move perpendicular to the longitudinal axis of the elongated main arm.

* * * * *